A. M. HAMMERSON.
INFANT'S COAT.
APPLICATION FILED APR. 7, 1917.
1,249,076.
Patented Dec. 4, 1917.
2 SHEETS—SHEET 1.
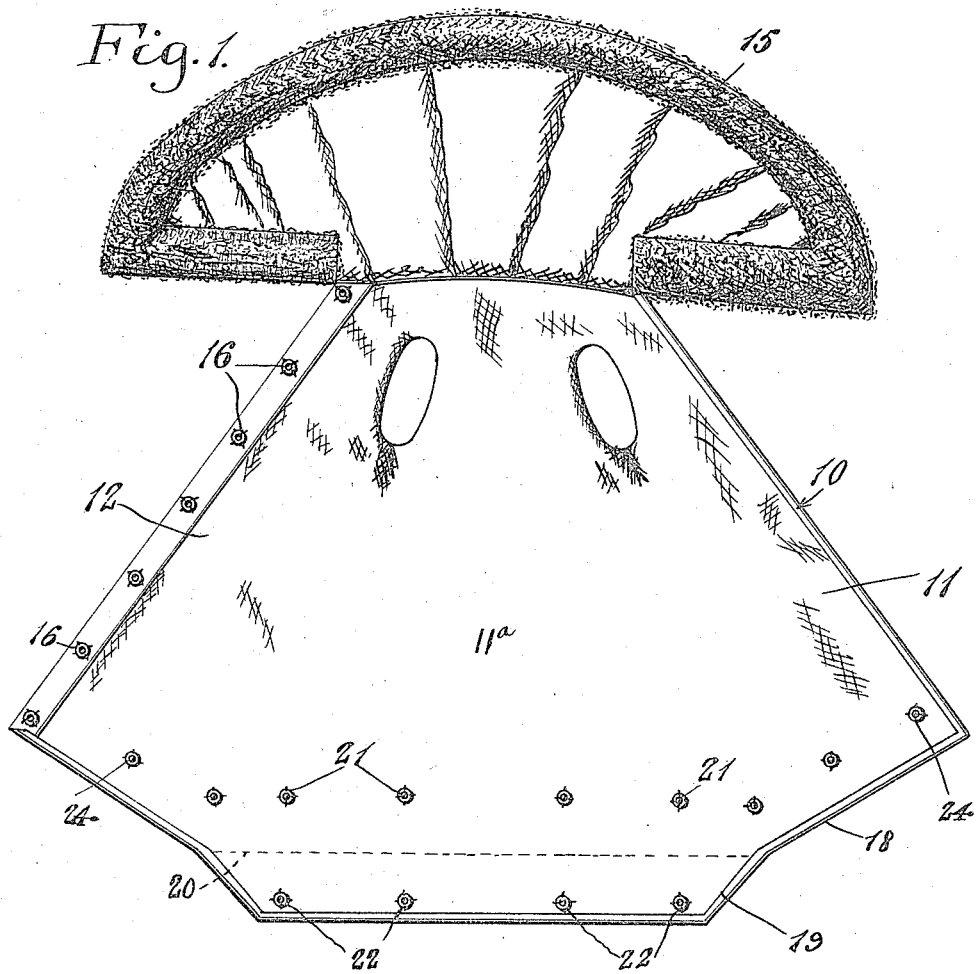
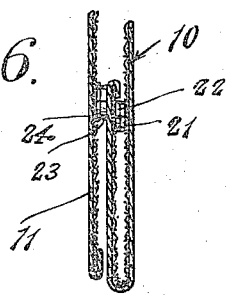
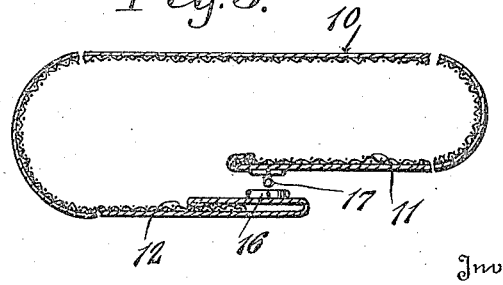
Inventor
A. M. Hammerson.

A. M. HAMMERSON.
INFANT'S COAT.
APPLICATION FILED APR. 7, 1917.
1,249,076.
Patented Dec. 4, 1917.
2 SHEETS—SHEET 2.
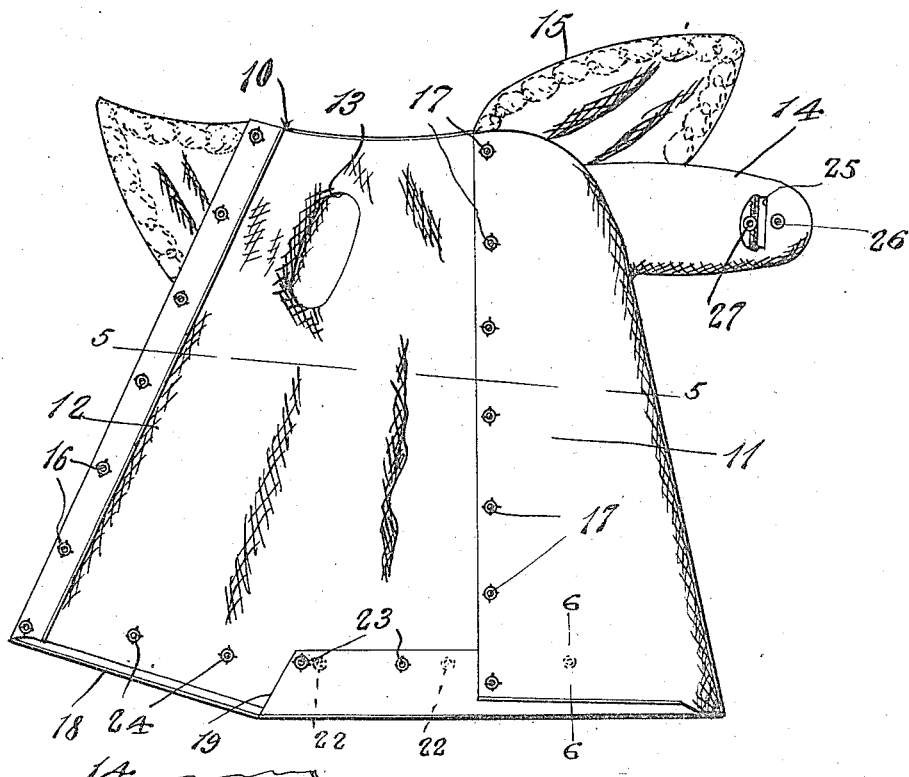
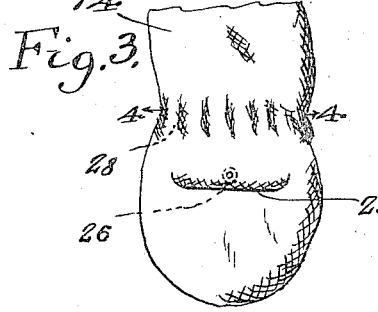
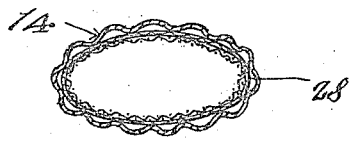
Witnesses:
Inventor
A. M. Hammerson
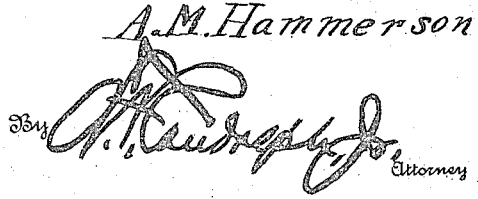
By
Attorney

UNITED STATES PATENT OFFICE.

ALYON M. HAMMERSON, OF NEW YORK, N. Y.

INFANT'S COAT.

1,249,076.

Specification of Letters Patent.

Patented Dec. 4, 1917.

Application filed April 7, 1917. Serial No. 160,483.

*To all whom it may concern:*

Be it known that I, ALYON M. HAMMERSON, a citizen of the United States, residing at New York, in the county of New York and State of New York, have invented certain new and useful Improvements in Infants' Coats; and I do hereby declare the following to be a full, clear, and exact description of the invention, such as will enable others skilled in the art to which it appertains to make and use the same.

This invention has for its object to provide an improved coat particularly designed for use of infants, the lower part of which may be closed to protect the legs, feet and lower portion of the body of the infant.

Another object is the provision of a coat including a novel type of sleeve providing a covering for the hands of the infant and permitting, when desired, free use of the infant's hands.

With these and other objects in view, the invention consists in the novel construction, combination and arrangement of parts as will be hereinafter specifically described, claimed and illustrated in the accompanying drawing, in which:

Figure 1 represents a plan view of the garment, in extended position,

Fig. 2 represents a plan view of the coat, partly closed,

Fig. 3 represents a fragmentary plan view of one of the coat sleeves,

Fig. 4 represents a transverse sectional view on the line 4—4 of Fig. 3,

Fig. 5 represents a transverse sectional view on the line 5—5 of Fig. 2, showing the coat closed but unfastened, and Fig. 6 represents a fragmentary sectional view on the line 6—6 of Fig. 2.

Referring to the drawings in detail, wherein similar reference numerals designate corresponding parts throughout the several views, the numeral 10 indicates generally the body part of the coat including the back 11$^a$ and inner and outer front edges 11 and 12, respectively, which are adapted to be overlapped to provide a closure for the front of the coat. The upper part of the body 10 is formed with the usual sleeve holes 13, in which are secured the sleeves 14, and a collar 15, preferably of the cape type, is fastened to the upper edge of the body 10 and is designed to overlie and protect the shoulders and upper arm portions of the infant.

Socket members 16 of a preferred type of snap fastener are secured to the inner portion and adjacent the edge of the front 12, and are adapted to coöperate with the balls or studs 17 secured to the outer portion of the inner edge 11, whereby the overlapped edges 11 and 12 are secured together.

The lower edge 18 of the body of the coat is formed with a depending flap 19, arranged centrally of the lower edge 18 and adapted to be folded along the dotted line 20 in Fig. 1 to the position shown in Fig. 2. An adequate number, preferably four, studs 21 are secured to the inner portion of the coat back 7 above the line of fold 20 and are adapted to coöperate with the socket members 22 secured to the flap 19, whereby the latter is secured at regular intervals to the coat back 11$^a$. When the flap 19 is folded, as shown in Fig. 2, it presents a continuation of the lower edge 18 of the coat body 10 and permits the legs of the infant to protrude through the lower part of the coat, which latter is applied to the infant.

Socket members 23 are fastened to the flap 19 on the side opposite the socket members 22 and are arranged outwardly of and intermediate the socket members 22, as clearly shown in Fig. 1. When the flap 19 is folded and secured by the studs 21 and 22, the socket members 23 are exposed and are in position to receive the studs 24 fastened to the inside of the coat body, thereby providing a closure for the lower end of the coat.

The ends of the sleeves 14 are closed except for a narrow slit 25 formed at a point inwardly of the end. A stud 26 of a snap fastener is secured to one edge of the slit 25, and the socket member 27 is secured to the other edge of the slit 25, and the stud and socket are adapted to be engaged to close the slit when the infant's hand is drawn into the sleeve.

In use, the coat is fastened in position about the infant by the studs and sockets 17 and 16, respectively, and the lower end of the coat may be thus opened by disengaging the studs 24 from the socket members 23. The studs 26 may be also disengaged from the socket members 27 to permit the infant's hands to extend through the slits 25. When desired, the lower end of the coat may be closed to provide protection for the legs and lower part of the body of the infant by engaging the studs 24 in the socket members 23, and the hands may be withdrawn into the sleeves 14 and the slits 25 closed by engaging the studs 26 in the socket members 27.

Elastic members 28 are secured in the sleeves 14 inwardly of the slits 25 to retain the sleeves in position about the wrist of the wearer.

What I claim is:

1. A coat including a body having overlapped front edges, means detachably securing the front edges together, a flap carried by the lower edge of the body, and means for securing the flap between the body and overlapped edges of the coat to provide a closure for the lower end thereof.

2. A coat including a body having overlapped front edges, means for detachably securing the front edges together, a flap formed centrally of the lower edge of the body, and means for detachably securing the back and front portions of the coat to the flap to close the lower end of the coat.

3. A coat including a body, a flap secured to the lower edge of the body, means for securing said flap at spaced points to the back of the body, and means for securing the front portion of the coat to the flap at points intermediate the securing points of the flap to the coat back.

In testimony whereof I affix my signature in presence of two witnesses.

ALYON M. HAMMERSON.

Witnesses:
WM. E. BARBER,
WM. GERHARDT.

Copies of this patent may be obtained for five cents each, by addressing the "Commissioner of Patents, Washington, D. C."